No. 698,944. Patented Apr. 29, 1902.
F. & R. HEINZELMAN.
ROLLER BEARING.
(Application filed May 27, 1901.)

(No Model.)

Witnesses
W. A. Alexander
J. R. Watkins

Inventors
F. Heinzelman
R. Heinzelman
By Attorneys
Fowler & Bryson

THE NORRIS PETERS CO., PHOTO-LITHO., WASHINGTON, D. C.

UNITED STATES PATENT OFFICE.

FREDERICK HEINZELMAN AND REGINALD HEINZELMAN, OF BELLEVILLE, ILLINOIS.

ROLLER-BEARING.

SPECIFICATION forming part of Letters Patent No. 698,944, dated April 29, 1902.

Application filed May 27, 1901. Serial No. 62,034. (No model.)

*To all whom it may concern:*

Be it known that we, FREDERICK HEINZELMAN and REGINALD HEINZELMAN, citizens of the United States, residing at Belleville, in the county of St. Clair and State of Illinois, have invented a certain new and useful Improvement in Roller-Bearings, of which the following is such a full, clear, and exact description as will enable any one skilled in the art to which it appertains to make and use the same, reference being had to the accompanying drawings, forming part of this specification.

The object of our invention is to simplify and improve the construction of that class of roller-bearings which are used on vehicles.

The main object of our invention is to so construct the bearing that it will not be necessary to form the same in two separate parts in order to apply it to the hub of the wheel.

Our invention consists in certain novel features and details of construction, all of which are described in the following specification and pointed out in the claims affixed hereto.

Figure 1:
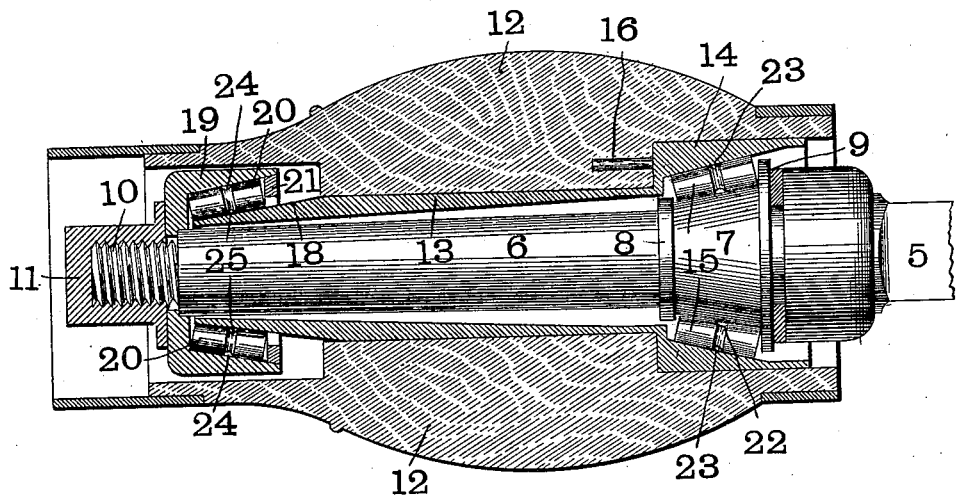
Figure 2:
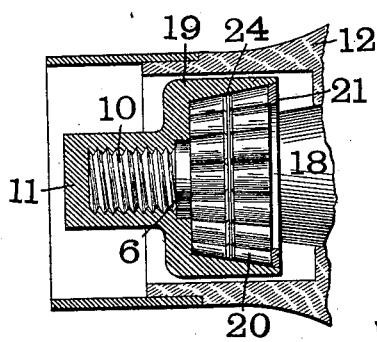
Figure 3:
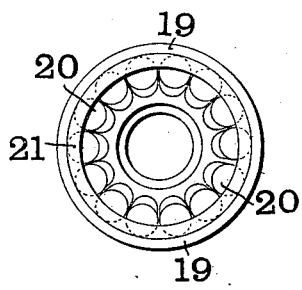
Figure 4:
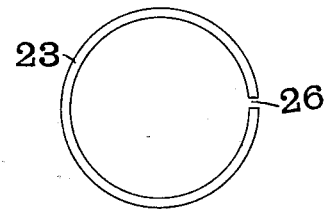

In the accompanying drawings, which illustrate one form of bearing made in accordance with our invention, Figure 1 is a longitudinal section of the complete bearing. Fig. 2 is a longitudinal section of one end of the bearing, showing a slight modification. Fig. 3 is an end view of the removable cap, and Fig. 4 is a detail view.

Like marks of reference refer to similar parts in the several views of the drawings.

5 is the central portion of the axle, which is preferably made square, as usual.

6 is the end of the axle, which passes through the hub of the wheel and is preferably cylindrical in form. One end of the axle 6 is surrounded by a conical bearing 7, provided with flanges 8 and 9, respectively. The opposite end of the part 6 is provided with screw-threads 10, which coöperate with a nut 11 to hold the parts of the bearing together.

12 is the hub of the wheel. The hub 12 is secured to a collar 13, provided at one end with an enlarged portion 14. The said enlarged portion 14 is provided with a conical recess which fits over the conical bearing 7 and between which and the surface of said conical bearing the antifriction-rolls 15 are interposed. Formed on the enlargement 14 are pins 16, which enter the wood of the hub 12 and prevent rotation between the hub and the sleeve 13. The outer end of the sleeve 13 is formed into a conical portion 18, between which and a cap 19, having formed in it a conical recess, are interposed antifriction-rolls 20, similar to the rolls 15, previously described. In order to allow the sleeve to be made in one piece and at the same time to allow it to pass through a finished wheel, it is necessary to place one set of rolls around the said sleeve and the other within the same. To do this with conical rolls, both sets of rolls must be inclined in the same direction, as shown in Fig. 1 of the drawings. The cap 19 is held in place by the nut 11. The cap 19 is provided with a removable flange 21, which serves the same purpose as the flanges 8 and 9, above described. Each of the rolls 15 is provided with a central groove 22, in which is placed a wire ring 23, which prevents the said rolls from dropping away from the conical bearing 7 when the axle 6 is removed from the sleeve 13. The ring 23 is a split ring—that is, it is divided at a point 26, as shown in Fig. 4. In like manner the rolls 20 are each provided with a central groove 24, in which is situated a wire ring 25, which holds the rolls in position in the cap 19 when the said cap is removed from the sleeve 13. The ring 25 is a split ring, like the ring 23; but, as will be readily understood, it is placed internally of the rolls in place of externally, like the ring 23.

In the modification shown in Fig. 2 the nut 11 in place of being made separate from the cap 19 is formed integral therewith.

In assembling the parts of our bearing the sleeve 13 is first driven into the hub 12, in which it is prevented from rotating by the pins 16, the rolls 15 being placed around the conical bearing 7 and held in position by the wire 23. The hub and attached sleeve are placed over the axle, so as to bring the rolls 15 between the conical face of the bearing 7 and the corresponding space of the enlarged portion 14 of the sleeve 13. The rolls 20 are now placed in the cap 19 and held in position by means of the ring 25. The cap is now placed over the end of the axle 6, bringing the rolls 20 between the conical end 18 of the sleeve 13 and the corresponding conical face of the cap 19. The nut 11 is now applied to the screw-threaded end 10 of the axle 6, thus securing the cap 19 firmly to the said axle.

It will be seen that our bearing is simple of construction and consists of but few parts and that it is not necessary to separate it into two parts in order to apply it to the hub, as has been usual heretofore in this class of bearings.

Having fully described our invention, what we claim as new, and desire to secure by Letters Patent of the United States, is—

1. In a roller-bearing, the combination with an axle, of a hub, and two independent sets of conical rolls surrounding said axle, one set being arranged at each end of the hub and both said sets of rolls being inclined in the same direction.

2. In a roller-bearing, the combination with an axle, of a sleeve surrounding said axle, a set of conical rolls arranged at one end of said sleeve between said axle and sleeve, and a set of conical rolls at the other end of said sleeve and surrounding said sleeve.

3. In a roller-bearing, the combination with an axle, of a sleeve surrounding said axle, a set of conical rolls arranged between said axle and sleeve at the inner end thereof, and a set of conical rolls arranged outside of said sleeve at the outer end thereof.

4. In a roller-bearing, the combination with an axle, of a sleeve surrounding said axle, a set of conical rolls arranged at one end of said sleeve between said axle and sleeve, a removable cap carried by said axle at the other end of said sleeve and surrounding the same, and a set of conical rolls between said removable cap and sleeve.

5. In a roller-bearing, the combination with an axle, of a sleeve surrounding said axle and having an enlarged portion at one end of said sleeve, a set of conical rolls arranged within said enlarged portion and around said axle, a second set of conical rolls surrounding the opposite end of said sleeve, and a removable cap surrounding said second set of rolls.

In testimony whereof we have hereunto set our hands and affixed our seals in the presence of the two subscribing witnesses.

FREDERICK HEINZELMAN. [L. S.]
REGINALD HEINZELMAN. [L. S.]

Witnesses:
JAMES H. BRYSON,
W. A. ALEXANDER.